(12) United States Patent
Ochs et al.

(10) Patent No.: US 8,310,717 B2
(45) Date of Patent: Nov. 13, 2012

(54) APPLICATION DRIVEN SPOT COLOR OPTIMIZER FOR REPROGRAPHICS

(75) Inventors: Matthew James Ochs, Webster, NY (US); John Allott Moore, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 537 days.

(21) Appl. No.: 12/354,945

(22) Filed: Jan. 16, 2009

(65) Prior Publication Data

US 2010/0182659 A1      Jul. 22, 2010

(51) Int. Cl.
*H04N 1/46*      (2006.01)

(52) U.S. Cl. .................... 358/1.9; 358/2.1; 358/518

(58) Field of Classification Search .............. 358/1.1, 358/1.9, 1.13, 1.18, 2.1, 300, 448, 501, 515, 358/518, 517, 534; 382/162, 167
See application file for complete search history.

(56) References Cited

U.S. PATENT DOCUMENTS

| | | | | |
|---|---|---|---|---|
| 5,237,425 A * | 8/1993 | Tagami et al. | .................. | 358/500 |
| 6,295,133 B1 * | 9/2001 | Bloomquist et al. | ........... | 358/1.1 |
| 6,426,802 B1 * | 7/2002 | Lin | .................. | 358/1.9 |
| 6,456,395 B1 * | 9/2002 | Ringness | ....................... | 358/1.9 |
| 6,559,975 B1 * | 5/2003 | Tolmer et al. | .................. | 358/1.9 |
| 6,594,034 B1 * | 7/2003 | Bloomquist et al. | ........ | 358/1.18 |
| 6,859,289 B1 * | 2/2005 | Walmsley | .................... | 358/1.18 |
| 7,239,426 B2 * | 7/2007 | Iwasaki | .......................... | 358/2.1 |
| 7,511,854 B2 * | 3/2009 | Yoshikawa et al. | ........... | 358/1.9 |
| 7,612,926 B2 * | 11/2009 | Jodra et al. | .................... | 358/518 |
| 7,791,776 B2 * | 9/2010 | Nielsen et al. | ................ | 358/518 |
| 2002/0054398 A1 * | 5/2002 | Bloomquist et al. | ......... | 358/529 |
| 2003/0043393 A1 * | 3/2003 | Iwasaki | .......................... | 358/1.9 |
| 2004/0032602 A1 * | 2/2004 | Teraue | ........................... | 358/1.9 |
| 2005/0168761 A1 * | 8/2005 | Yoshikawa et al. | ........... | 358/1.9 |
| 2005/0212907 A1 * | 9/2005 | Teraue | ........................... | 347/254 |
| 2006/0098233 A1 * | 5/2006 | Jodra et al. | .................... | 358/3.26 |
| 2007/0097464 A1 * | 5/2007 | Nielsen et al. | ................ | 358/518 |
| 2007/0139671 A1 * | 6/2007 | Stevens | ......................... | 358/1.9 |
| 2008/0111998 A1 * | 5/2008 | Edge | .............................. | 358/1.9 |
| 2008/0239343 A1 | 10/2008 | Ochs et al. | | |

* cited by examiner

*Primary Examiner* — Kimberly A Williams
(74) *Attorney, Agent, or Firm* — Pillsbury Winthrop Shaw Pittman, LLP

(57) ABSTRACT

A method for identifying one or more spot colors in a full color multi-bit image data, and processing the identified spot colors for output on an image printing system is provided. The method includes inputting the full color image data, wherein the full color image data includes a plurality of pixels; analyzing the inputted image to identify the pixels with a spot color from the pixels with a non-spot color, wherein each pixel with a spot color is within a predetermined threshold from a desired color value; processing the identified spot color pixels; and combining the processed spot color pixels with non-spot color pixels to form a data structure.

14 Claims, 5 Drawing Sheets

APPLICATION DRIVEN SPOT COLOR OPTIMIZER FOR REPROGRAPHICS

BACKGROUND

1. Field

The present disclosure relates to a method and a system for identifying one or more spot colors in a full color multi-bit image data, and processing the identified spot colors for output on an image printing system.

2. Description of Related Art

Color printing may be performed using a highlight color printing system. In this type of printing, only two inks are used in the printing process. These inks comprise a black color and a highlight color (e.g., usually a red color, or a blue color). Electronic printing systems may be designed specifically for highlight color printing. Highlight color printing systems are generally faster and less expensive than full color printing systems because only two inks are processed, as opposed to the three or four inks, which must be processed in order to obtain full color images. One such application is a teacher's edition textbook, which includes single color main text, such as black color, and highlight color answers, printed in a highlight color, such as red color.

Spot colors are recognized or standardized colors, for example, according to an industry, proprietary, and/or organizational system. Some of the known spot color classification systems include: Pantone®, Toyo, DIC, American Newspaper Publishers Association (ANPA), and HKS.

Spot color inks are used to achieve a specific color more accurately than process mixtures of cyan-magenta-yellow-black (CMYK), to avoid the halftone pattern associated with process color printing, or to print colors outside the gamut of CMYK. A spot color ink (also called "spot ink") provides a pre-mixed color ink that is directly printed, instead of a color that is obtained by halftoned levels of CMYK components at the time when the color is being printed. Spot color inks are common in the offset printing trade, and are becoming available for digital production color systems. Typically, spot color inks are offered in the colors of popular samples-based color systems. For example, a user may acquire a particular spot ink color by selecting the color from a suite of samples of existing spot ink colors.

Spot color inks are often selected to ensure the accuracy of a specific color. For example, the red color of Xerox® Corporation's logo is specified as Pantone® 032. Many of Xerox®'s printed collaterals and packaging are printed with offset or flexographic inks specifically formulated to achieve this unique red color (i.e., Pantone® 032).

Generally, a scan of a document having a spot color would be scanned as full color image data, and then printed on the highlight color printing system. This results in black color being written to spot color areas, which destroys the purity of the desired spot color. A customer may address and fix this problem by scanning the document having a spot color to a binary image, and manually selecting areas where the customer would want the spot color to be printed. This would ensure that no black color is written in spot color areas. Also, in a scanned file, the output most likely will not be reproduced with the exactly desired RGB values (i.e., red-green-blue coordinates in RGB color space) due to normal system limitations. So, the image quality of the print could result in being unacceptable to a customer.

SUMMARY

According to one aspect of the present disclosure, a method for identifying one or more spot colors in a full color multi-bit image data, and processing the identified spot colors for output on an image printing system is provided. The method includes inputting the full color image data, wherein the full color image data includes a plurality of pixels; analyzing the inputted image data to identify the pixels with a spot color from the pixels with a non-spot color, wherein each pixel with a spot color is within a predetermined threshold from a desired color value; processing the identified spot color pixels; and combining the processed spot color pixels with non-spot color pixels to form a data structure.

According to another aspect of the present disclosure, a system for identifying one or more spot colors in a full color multi-bit image data, and processing the identified spot colors for output on an image printing system is provided. The system includes an image input device, and an image processing device. The image input device is configured to input the full color image data, wherein the full color image data includes a plurality of pixels. The image processing device configured to receive the image data from the image input device. The image processing device includes a detector, a spot color processor, and a combining device. The detector is configured to analyze the inputted image data to identify the pixels with a spot color from the pixels with a non-spot color, wherein each pixel with a spot color is within a predetermined threshold from a desired color value. The spot color processor is configured to process identified spot color pixels. The combining device is configured to combine the processed spot color pixels with non-spot color pixels to form a data structure.

Other objects, features, and advantages of one or more embodiments of the present disclosure will seem apparent from the following detailed description, and accompanying drawings, and the appended claims.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

Figure 1:
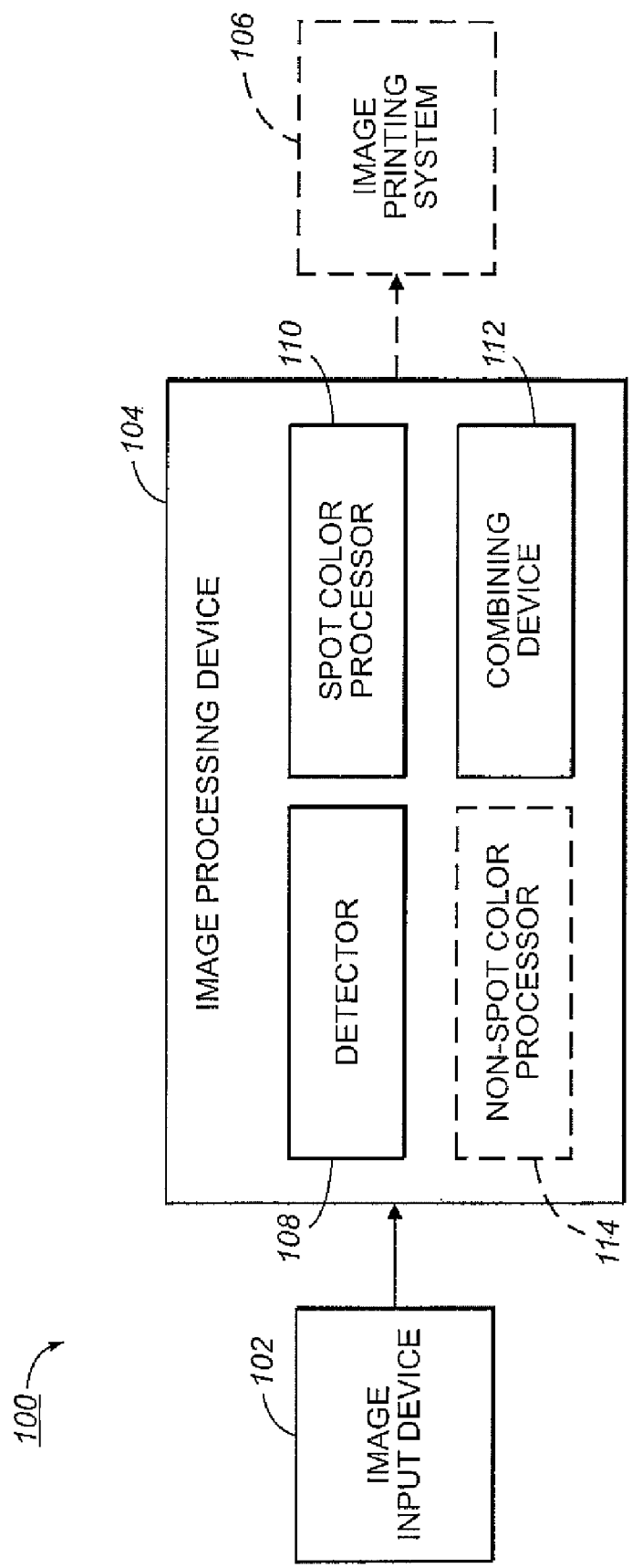
FIG. 1 illustrates a system for identifying one or more spot colors in a full color multi-bit image data, and processing the identified spot colors for output on an image printing system in accordance with an embodiment of the present disclosure.
Figure 2:
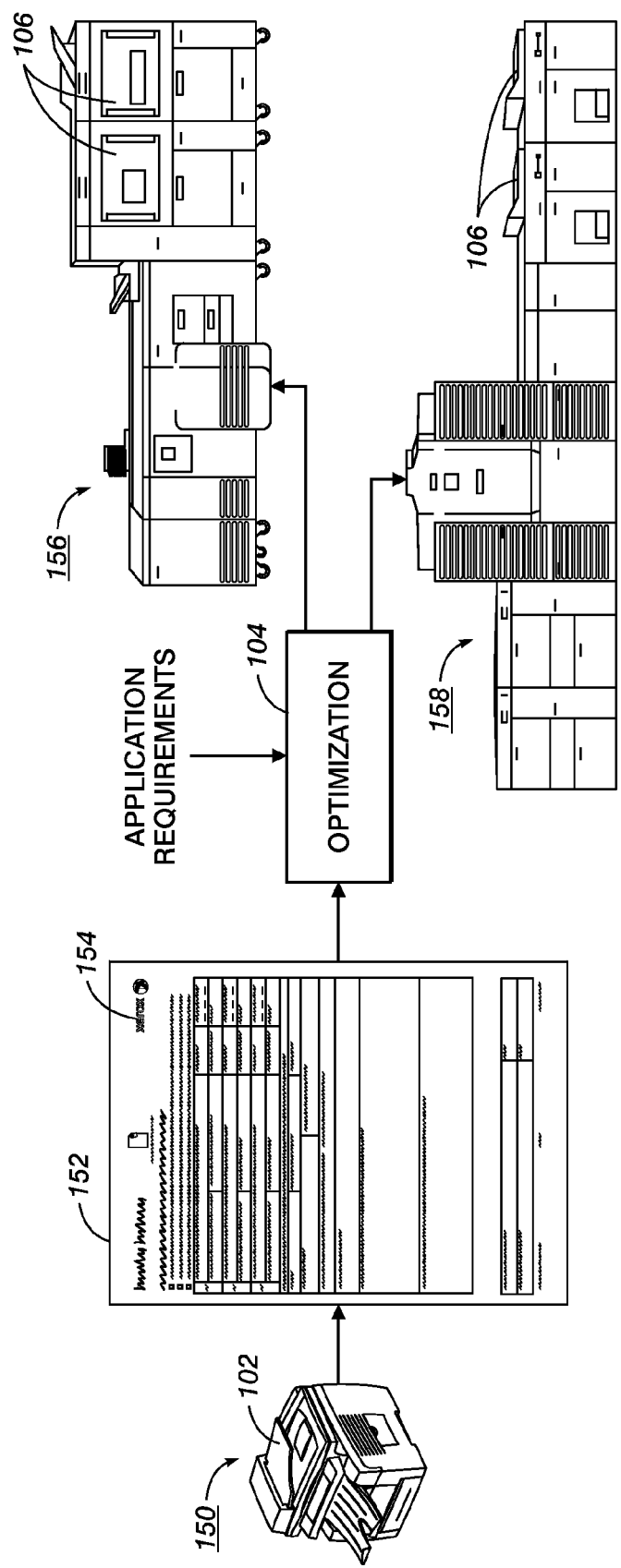
FIG. 2 illustrates an exemplary image path of the system for identifying one or more spot colors in a full color multi-bit image data, and processing the identified spot colors for output on an image printing system in accordance with an embodiment of the present disclosure.

In FIGS. 1 and 2, a system 100 for identifying one or more spot colors in a fall color multi-bit image data, and processing the identified spot colors for output on an image printing system 106 is provided. The system 100 includes an image input device 102, and an image processing device 104. The image input device 102 is configured to input the full color image data, wherein the full color image data comprises a plurality of pixels. The image processing device 104 is configured to receive the image data from the image input device 102. The image processing device 104 includes a detector 108, a spot color processor 110, and a combining device 112. The detector 108 is configured to analyze the inputted image data to identify the pixels with a spot color from the pixels with a non-spot color, wherein each pixel with a spot color is within a predetermined threshold from a desired color value. The spot color processor 110 is configured to process the identified spot color pixels. The combining device 112 is configured to combine the processed spot color pixels with non-spot color pixels to form a data structure. The data structure thus comprises the spot colors. The data structure may have machine-readable instructions that may be stored in a memory device. In one embodiment, the detector 108 is configured to analyze the inputted image data on a pixel-by-pixel basis to identify the pixels with a spot color from the pixels with a non-spot color Generally, a customer would like to ensure a certain spot color is reproduced faithfully in their scans. As noted above, the present disclosure receives a full color multi-bit image data as an input. Each pixel of the full color multi-bit image data is then examined individually to identify if it is close to a specific or desired spot color. The identified pixels are then processed to ensure the purity of the desired spot color.

The present disclosure describes different ways (two are described in FIGS. 3 and 4) to process the identified spot color in the input image data. The processes, described in FIGS. 3 and 4, receive a full color image data as input and then isolate a range of pixels at or close to an RGB value (i.e., red-green-blue coordinates in RGB color space). The purpose is to "snap" similar colors to a nearby spot color.

Figure 4:
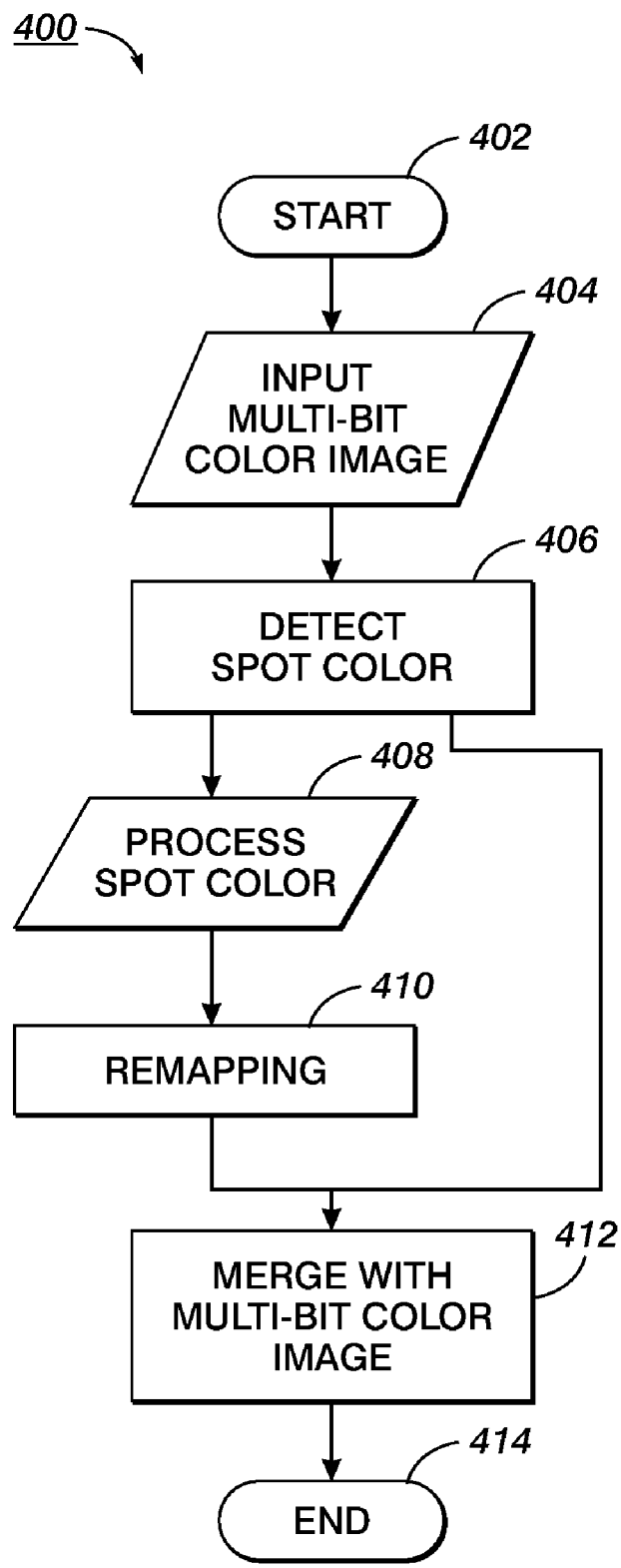
FIG. 4 illustrates a method for identifying a spot color in a full color multi-bit image data, and processing the identified spot color for output on a digital color printing system in accordance with an embodiment of the present disclosure.

One method as described in FIG. 4 of the present disclosure involves mapping these identified pixels to that spot color (i.e., at or close to an RGB value), all in a full multi-bit color space. The final output of this method remains as a full color multi-bit image data. This method is specifically intended for digital color printing systems.

Figure 3:
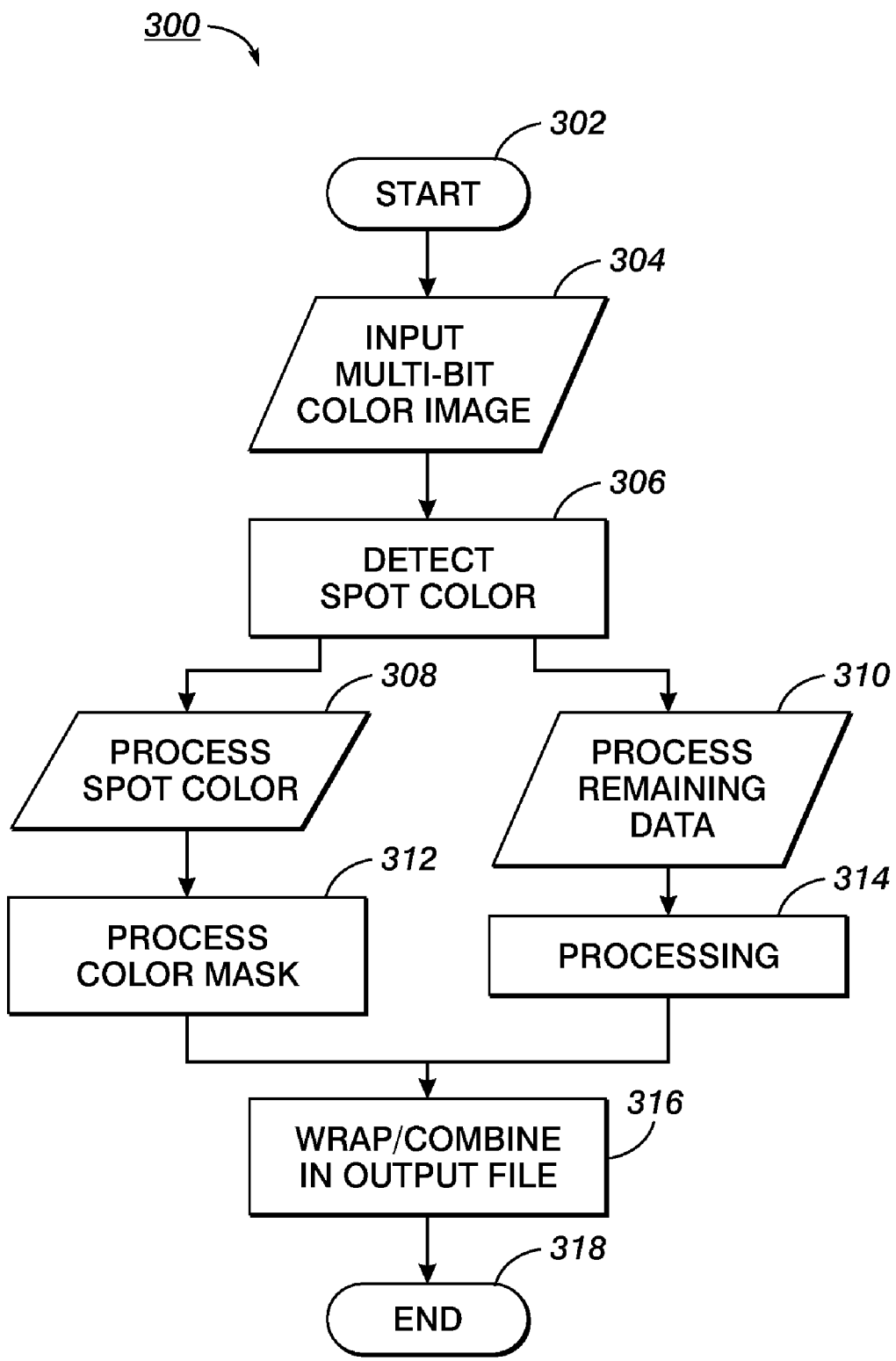
FIG. 3 illustrates a method for identifying a spot color in a full color multi-bit image data, and processing the identified spot color for output on a highlight color printing system in accordance with an embodiment of the present disclosure.

The other method as described in FIG. 3 of the present disclosure extracts these identified pixels from the rest of the scan and optimizes the output as a mixed raster file. The method described in FIG. 3 is specifically intended for highlight color printing systems.

The type of processing to be performed on the detected spot color may be decided based on the image quality in the system, which is optimized based on the customer requirements. File size may be one consideration, which may be taken into account. Rendering of black text and/or rendering of different gray tones may be other considerations that may be taken into account. This would drive a solution to be one-bit binary, eight-bit gray, full 24-bit color, or a combination of any of the above. The methods 300 and 400 described in the present disclosure show how adaptive the image processing of the detected spot color is to optimize image quality based on customer requirements.

As noted earlier, spot color applications require a high degree of color accuracy and purity. An example of a spot color application is printing of a corporate logo (e.g., Xerox® Corporation's logo specified as Pantone® 032, or a specific red color). FIG. 2 shows the full color input image data 152 having a corporate logo 154 having a spot color (e.g., red color having R:255, G:0, B:0). It is desirable, when printing a corporate logo that the spot colors be reproduced exactly, without any muddiness or colorant blending errors.

As shown in FIGS. 1 and 2, the image input device 102 of the system 100 is configured to read or receive the input image data portrayed in a full color coordinate system of a three-dimensional color space. In one embodiment, the input image data is in a multi-bit configuration (i.e., 24-bit). The full color input image data comprises a plurality of pixels.

The format of the image data may be a TIFF file or a JPEG file. In one embodiment, the format of the image data may be in a "high-level" format, for example, a PDF file. The PDF files and other high-level formats may allow to call out Pantone colors, for example, by a name or a number. In another embodiment, the image data may be in an "interpreted" format (i.e., up to and including binary). In such an interpreted format, after sending the PDF file to the image printing system the image data is extracted, pre-processed, and feed to the image processing device 104.

As shown in FIG. 2, the image input device 102 is a scanner 150. The image input device 102 may include one or more other suitable color image input devices, such as a computer image generator, or an electronic or other stored image reader, or any other color image input devices. The incoming or sampled colors from the full color input image data may be defined in a red-green-blue (RGB) color coordinate system. However, other input color coordinate systems may be employed, for example, cyan-yellow-magenta (CYM), LAB, etc.

The input image data may be a color original document containing at least one spot color that has been scanned by the full color scanner (e.g., the scanner 150 shown in FIG. 2) into a 24-bit device independent color RGB image data. Lower bit color images may be upconverted to a 24-bit images and processed using the methods 300 and 400 described in the present disclosure. Other color spaces such as LAB or YCbCr may be converted to the RGB color space and then processed using the methods 300 and 400 described in the present disclosure.

The image processing device 104 is configured to receive the full color multi-bit input image data, such as 24-bit RGB, from the image input device 102. The image processing device 104 is configured to carry out various processing operations to convert the full color input image data to the data structure comprising the spot colors. The data structure includes machine-readable instructions may be stored in a memory device. As noted above, the image processing device 104 includes the detector 108, the spot color processor 110, and the combining device 112. In one embodiment, the image processing device 104 may include a non-spot color processor 114 as shown in FIG. 1.

An image printing system 106 is configured to receive the data structure comprising the spot colors from the image processing device 104. There are different types of image printing systems 106 that are configured to receive the data structure comprising the spot colors from the image processing device 104. For example, as shown in FIG. 2, the image printing system 106 may include a highlight color printing system 156, or a digital color printing system 158. Other image printing systems may include a light production color printing system.

Based on whether the output of the system 100 is to be sent to the highlight color printing system 156 or the digital color printing system 158, the present disclosure describes different ways to process the identified spot color in the input image. If the output of the system 100 is to be sent to the highlight color printing system 156, the present disclosure proposes the method 300 to process the identified spot color in the input image data. On the other hand, if the output of the system 100 is to be sent to the digital color printing system 158, the present disclosure proposes the method 400 to process the identified spot color in the input image data.

FIG. 3 shows the method 300 for identifying a spot color in a full color multi-bit image data, and processing the identified spot color for output on the highlight color printing system in accordance with an embodiment of the present disclosure. As noted above, the method 300 is specifically intended for the highlight color image printing systems. The method 300 begins at procedure 302 and proceeds to procedure 304 where a full color multi-bit image data is received, such as by being input, scanned, or retrieved from memory at image input device 102.

The method 300 then proceeds to procedure 306 in which the full color multi-bit (e.g., 24-bit) input image data received at procedure 304 is analyzed on a pixel-by-pixel basis to determine whether each pixel is within a predetermined threshold from a desired color value, thus, identifying the pixels with spot colors from the pixels with non-spot colors based on the analysis. The detector 108 of the image processing device 104 is configured to analyze the inputted image data on a pixel-by-pixel basis, and identify the pixels with spot colors from the pixels with non-spot colors. In one embodiment, the detector 108 of the image processing device 104 may be an individual processor or multiple processors with the different functions (i.e., analyze the inputted image data on a pixel-by-pixel basis, and identifying the pixels with spot colors from the pixels with non-spot colors based on the analysis) distributed among them.

The pixel-by-pixel basis analysis may be used to identify a spot color to ensure edges remain sharp. In another embodiment, a large window may be used to identify a spot color. In other embodiments, a sample subset of pixels may be analyzed to identify the pixels with spot color, or, in a high-level language a line of instruction may be analyzed to identify the pixels with spot color.

In accordance with an aspect of the present disclosure, the detector 108 of the image processing device 104 may use an algorithm to detect and separate out a spot color. One such an algorithm is described below. As noted above, the present disclosure receives the full color multi-bit scan. The customer would identify a spot color that they would like to be reproduced faithfully. For example, a shade of blue that has RGB values of 65, 105, and 225, respectively (e.g., this spot color could be selected from memory, input manually, or scanned and stored in memory from a target or "training" document containing that spot color). Each pixel from the input image data will be examined individually to see if it is same as or within a close range of this specific spot color. Since the input is a scanned file, limitations in the system may have resulted in areas that may have RGB values somewhat close to but not exactly reproduced. This makes it desirable to have a tolerance control with this present disclosure to capture some of these pixels. Such a tolerance control is used in the algorithm, described below, to detect and separate out a spot color.

A pixel in the input image data may be represented by R, G, B coordinates (i.e., red-green-blue coordinates in the full color image data) in an RGB color space. The actual color input is represented by R, G, B; and the desired color output represented by R', G', B'. A tolerance value is defined and is equal to x. If a pixel is within the tolerance x from the customer specified spot color (e.g., blue color having RGB values of (65, 105, 225)), the pixel will be converted to that specified spot color. In other words, as shown by the equations below, if the absolute value of the difference between the desired color output and the actual color input is less than or equal to the tolerance x, then the desired color output will be used. If the absolute value of the difference between the desired color output and the actual color input is greater than the tolerance x, then the desired color output will be assigned the value of the actual color input.

$$\text{if:} (|R'-R| \leq x) \& (|G'-G| \leq x) \& (|B'-B| \leq x)$$

$$\text{then:} R'=R', G'=G', B'=B'$$

$$\text{else:} R'=R, G'=G, B'=B$$

If the tolerance x is set to a value of, for example, 10, then each color channel (i.e., red, green and blue channels in the full color image data) should be within ±10 levels of the desired RGB. In one embodiment, if the scan quality is poor, the customer may adjust this tolerance x to help extract the spot color they are trying to preserve. A different tolerance for each of the R, G, and B channels could be used (e.g., $X_R$, $X_G$, $X_B$)

Once the spot color is detected at procedure 306, the method 300 proceeds to procedures 308 and 310, respectively. In other words, the identified spot color pixels are then split out from the rest of the input image data, resulting in two separate images that are processed separately (i.e., at procedures 308 and 310) from each other. At procedure 308, the identified spot color pixels are processed and at procedure 310 the non-spot color pixels are processed. The method 300 proceeds to procedure 312 from the procedure 308, and to procedure 314 from the procedure 310, respectively.

The spot color processor 110 is configured to process identified spot color pixels as a first image plane and non-spot color pixels as a second image plane. Specifically, at procedure 312, the image data with the spot color pixels are separately processed as an independent color plane (i.e., the first image plane) using any processing desirable to process the spot color pixel data. For example, the image data with spot color pixels may be converted from 24-bit color image data to a high resolution 1-bit binary image data. In other words, the multi-bit representation is converted to a single bit representation for processing purposes. This can be done different ways. If solid spot color areas are desired, a threshold may be applied. If the customer requires "tints" to be present, a half-tone dot may be applied to reproduce different tones. In accordance with other aspects of the present disclosure, the image data with spot color pixels may be converted from 24-bit color image data to a scaled-down 8-bit gray image data, maintaining a 24-bit image data but reducing the resolution, compression using image formats such as CCITT4, JPEG, LZW, etc.

At procedures 310 and 314, the image data with non-spot color pixels are separately processed as a second, independent color plane (i.e., the second image plane) using any processing desirable to process the non-spot color pixel data. After the various independent processing takes place at procedures 308-314, the separate image planes (i.e., the first and the second image planes) may be combined, at procedure 316, into an output file, such as a mixed raster file type (e.g., PDF, XPS, JPEG 2000, XML and any other mixed raster file types). In this file, the one-bit portion is written as a mask that has RGB values of 255, 0, and 0 respectively. That is, the one-bit binary pixels are assigned a spot color value in the data structure. The method 300 ends at procedure 318. Thus, the method 300 described in FIG. 3 ensures that the spot color, for example, of the corporate logo are reproduced exactly as desired.

Since every pixel may contain only one colorant, this avoids mixing of colorants and possible resultant blurring or dulling of the image. Additionally, because the image planes are separated, independent processing, particular to the particular color, can be performed. Moreover, because one or more of the image planes can be reduced to a lower bit image data, memory size and processing demands can be greatly reduced. For example, an 11.times.17 inch 24-bit color image data with a file size of 26.5 MB may be reduced to 88 KB file size if reduced to 1-bit information.

In accordance with various aspects, the separate image planes may form masks, each of which can be adjustably modified prior to output to a variety of desirable output colors. For example, a blue spot color original may be isolated and converted to one-bit data in the spot color mask. However, during the formation of the output file, the mask can be assigned an arbitrary color value in any color space, such as red in an RGB color space by assigning indicated pixels with a value of 1 to an RGB value of R=255, G=0, and B=0. Similarly, the non-spot pixels can be adjusted and assigned an arbitrary color, such as black or white.

FIG. 4 shows a method 400 for identifying a spot color in a full color multi-bit image data, and processing the identified spot color for output on a digital color printing system in accordance with an embodiment of the present disclosure. The method 400 is specifically intended for the digital color image printing systems. The method 400 begins at procedure 402 and proceeds to procedure 404 where a full color multi-bit image data is received, such as by being input, scanned, or retrieved from memory at image input device 102.

The method 400 then proceeds to procedure 406 in which the full color multi-bit input image data received at procedure 404 is analyzed on a pixel-by-pixel basis to determine whether each pixel is within a predetermined threshold from a desired color value, thus, identifying the pixels with spot colors from the pixels with non-spot colors based on the analysis. The procedure 406 in the method 400 is similar to procedure 306 in the method 300 described in detail above, and hence will not be described here.

Once the spot color is detected at procedure 406, the method 400 proceeds to procedure 408 in which the identified spot color pixels are processed. Similar to the method 300, the method 400 separates the identified spot color pixels from the rest of the input image data, resulting in two separate images. But instead of thresholding down to one-bit configuration (i.e., as is the case in the method 300), the image data with the identified spot color pixels are kept at the multi-bit (e.g., 24-bit) configuration during processing. The spot color processor 110 is configured to apply a Toner Reproduction Curve (i.e., TRC) to the identified spot color pixels to force a mapping of the identified spot color pixels to a spot color value in the data structure. Specifically, at procedure 410, The Toner Reproduction Curve is applied to the image data with the spot color pixels to force a mapping of all of these spot color pixels to RGB of 255, 0, and 0. After remapping at procedure 410, the method 400 proceeds to procedure 412 in which the image data with spot color pixels is merged back in with the rest of the input image data, but with desired areas in the input image data (e.g., the corporate logo) only containing the exact desired values. Since all the pixel data is of the same bit depth and resolution, the output obtained from the method 400 may be written as any desired file type.

Figure 5:
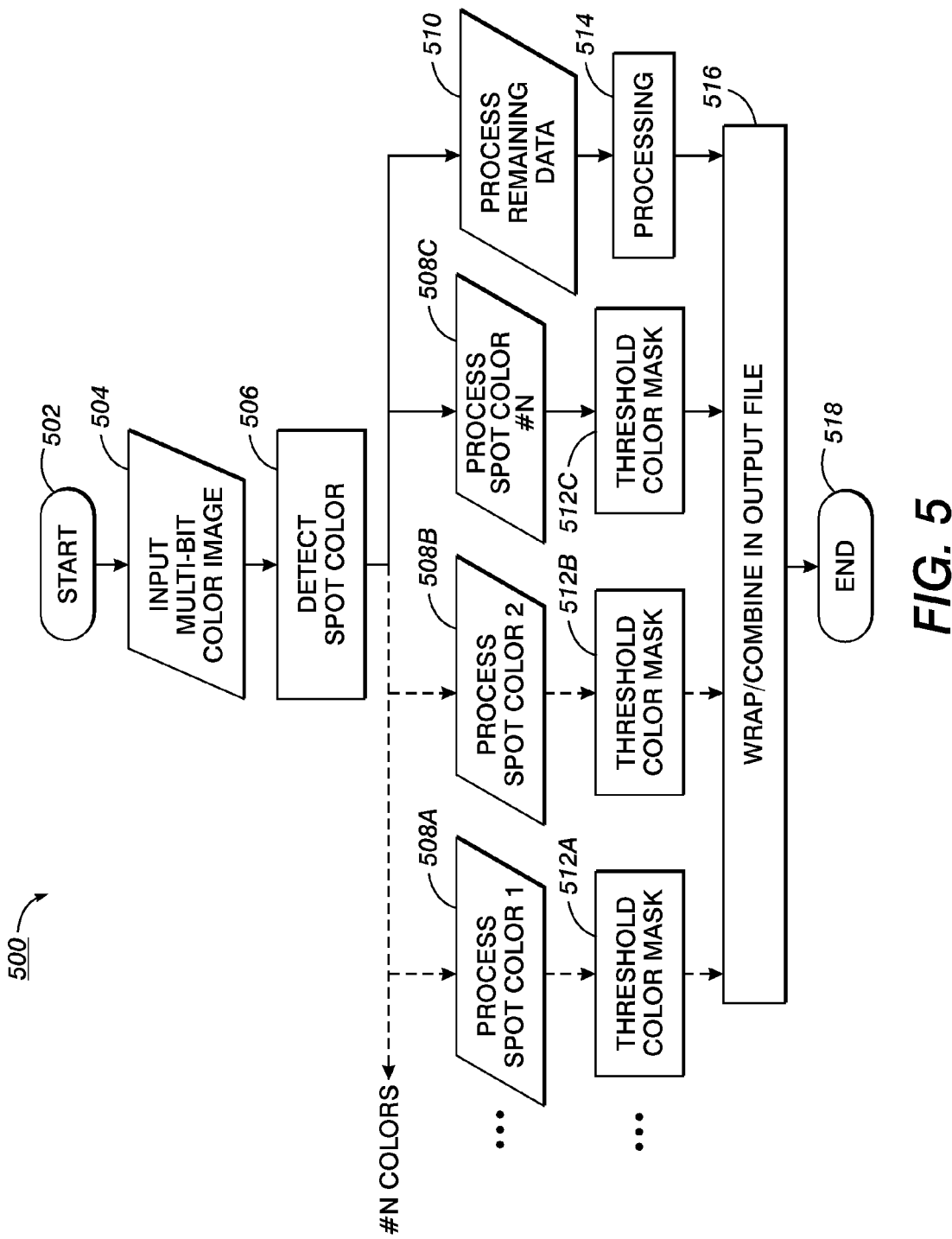
FIG. 5 illustrates a method for identifying multiple spot colors in a full color multi-bit image data, and processing the identified spot colors for output on a highlight color printing system in accordance with an embodiment of the present disclosure.

The present disclosure is not limited to detecting a single spot color. Instead, if multiple spot colors are present, these multiple spot colors are detected, depending on the customer needs. For example, as shown in FIG. 5, if a customer has a job containing multiple corporate logos and each one having a different spot color, the present disclosure is adaptive to accommodate that and treat it accordingly. FIG. 5 shows a method 500 for identifying multiple spot colors in a full color multi-bit image data, and processing the identified spot colors for output on the highlight color printing system in accordance with an embodiment of the present disclosure. The procedures 502, 504, 506, 510, 514, 516 and 518 of the method 500 is similar to 302, 304, 306, 310, 314, 316 and 318 in the method 300 described above, and hence will not be described in detail here.

Spot colors (e.g., N spot colors) are detected at procedure 506. Once the spot colors are detected at procedure 506, the method 500 proceeds to procedures 508A, 508B, 508C, and 510, respectively. In other words, the identified spot color pixels for each spot color are then split out or separated from the rest of the input image data, resulting in N+1 separate images that are processed separately from each other. At procedures 508A, 508B, and 508C, the identified spot color pixels for the spot color #1, the spot color #2, and so on upto the spot color # N are processed. At procedure 510, the non-spot color pixels are processed. The method 500 proceeds to procedures 512A, 512B, and 512C from the procedures 508A, 50813, and 508C, and to procedure 514 from the procedure 510, respectively. Also, the processing of the image data with spot color pixels taking place at procedures 508A, 508B, and 508C, and 512A, 512B, and 512C is similar to that at procedures 308, and 312 in method 300 described above, and hence will not be described in detail here.

The word "image printing system" as used herein encompasses any device, such as a copier, bookmaking machine, facsimile machine, or a multi-function machine. In addition, the word "image printing system" may include ink jet, laser or other pure printers, which performs a print outputting function for any purpose. In one embodiment, an image data or an image generally may include information in electronic form which is to be rendered on the print media by the image printing system and may include text, graphics, pictures, and the like.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A method for identifying and processing one or more spot colors in a full color multi-bit image data, the method comprising:
performing the following steps using an image processing device:
receiving the full color image data, wherein the full color image data comprises a plurality of pixels;
analyzing the inputted image data on a pixel-by-pixel basis to identify the pixels with a spot color from the pixels with a non-spot color, wherein each pixel with a spot color is within a predetermined threshold from a desired color value;
processing the identified spot color pixels;
combining the processed spot color pixels with non-spot color pixels to form a device independent data structure; and outputting the data structure to an image printing device, wherein the image processing device is separate and independent from the image printing device.

2. A method according to claim 1, wherein the image printing device is a highlight color printing system.

3. A method according to claim 2, wherein processing the identified spot color pixels comprises processing identified spot color pixels as a first image plane and processing non-spot color pixels as a second image plane.

4. A method according to claim 3, wherein the identified spot color pixels are converted to one-bit binary pixels during processing.

5. A method according to claim 4, wherein the identified spot color image plane forms a mask, and the one-bit binary pixels are assigned a spot color value in the data structure.

6. A method according to claim 1, wherein the image printing device is a digital color printing system.

7. A method according to claim 6, wherein processing the identified spot color pixels comprises applying a toner reproduction curve to the identified spot color pixels to force a mapping of the identified spot color pixels to a spot color value in the data structure.

8. A system for identifying and processing one or more spot colors in a full color multi-bit image data, the system comprising:
an image processing device configured to receive the full color image data from an image input device, wherein the full color image data comprising a plurality of pixels, the image processing device comprising:
a detector configured to analyze the inputted image data on a pixel-by-pixel basis to identify the pixels with a spot color from the pixels with a non-spot color, wherein each pixel with a spot color is within a predetermined threshold from a desired color value;
a spot color processor configured to process the identified spot color pixels; and
a combining device configured to combine the processed spot color pixels with non-spot color pixels to form a device independent data structure,
wherein the image processing device configured to output the device independent data structure to an image printing device, and wherein the image processing device is separate and independent from the image printing device.

9. A system according to claim 8, wherein the image printing device is a highlight color printing system.

10. A system according to claim 9, wherein the spot color processor is configured to process the identified spot color pixels as a first image plane and non-spot color pixels as a second image plane.

11. A system according to claim 10, wherein the identified spot color pixels are converted to one-bit binary pixels during processing.

12. A system according to claim 11, wherein the identified spot color image plane forms a mask, and the one-bit binary pixels are assigned a spot color value in the data structure.

13. A system according to claim 8, wherein the image printing device is a digital color printing system.

14. A system according to claim 13, wherein the spot color processor is configured to apply a toner reproduction curve to the identified spot color pixels to force a mapping of the identified spot color pixels to a spot color value in the data structure.

* * * * *